Sept. 21, 1954
C. H. SAVERY
2,689,748
AXLE SUPPORTING STRUCTURE FOR WHEELED VEHICLES
Filed Jan. 16, 1950
4 Sheets-Sheet 1
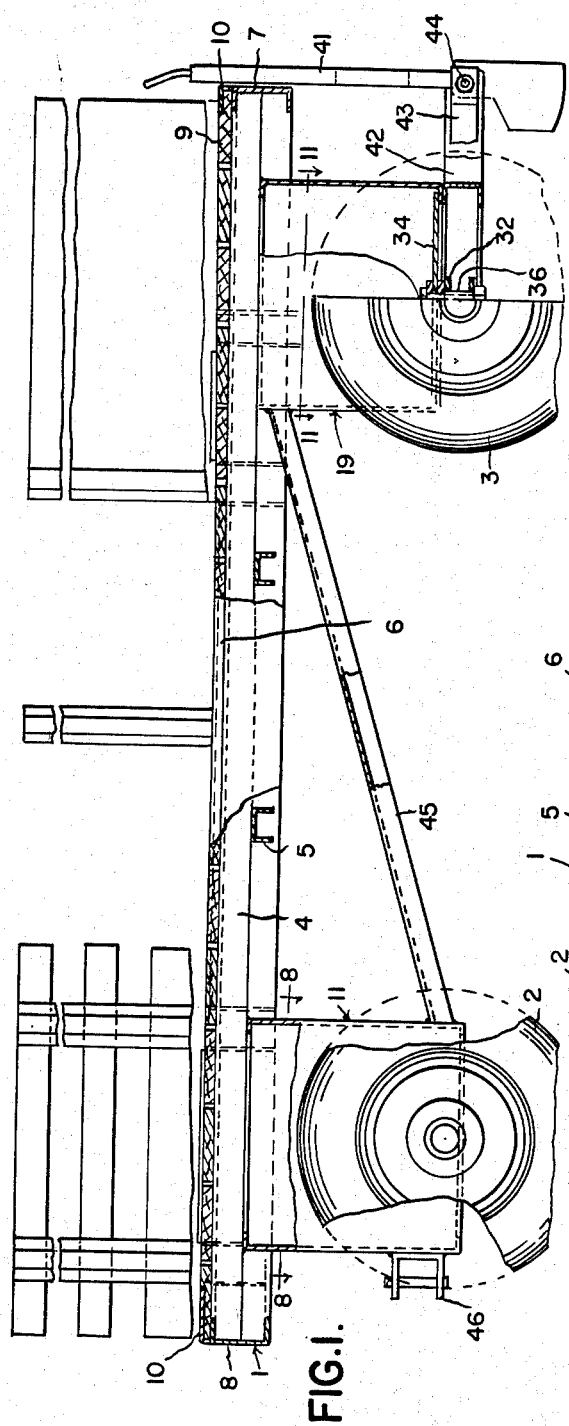
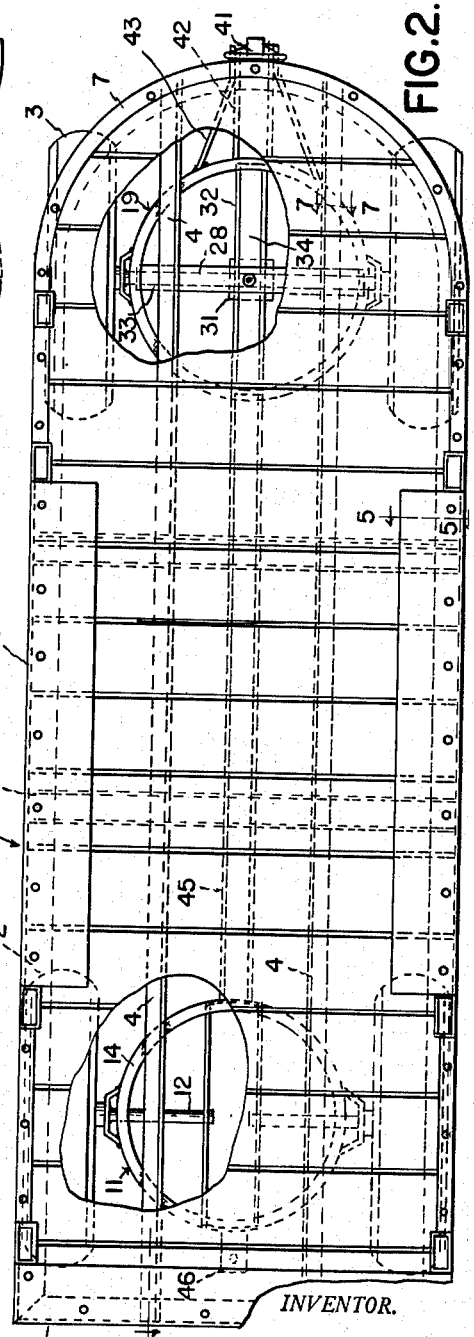
INVENTOR.
CLARENCE H. SAVERY
BY
Whittemore Hulbert & Belknap
ATTORNEYS Sept. 21, 1954  C. H. SAVERY  2,689,748
AXLE SUPPORTING STRUCTURE FOR WHEELED VEHICLES
Filed Jan. 16, 1950  4 Sheets-Sheet 2
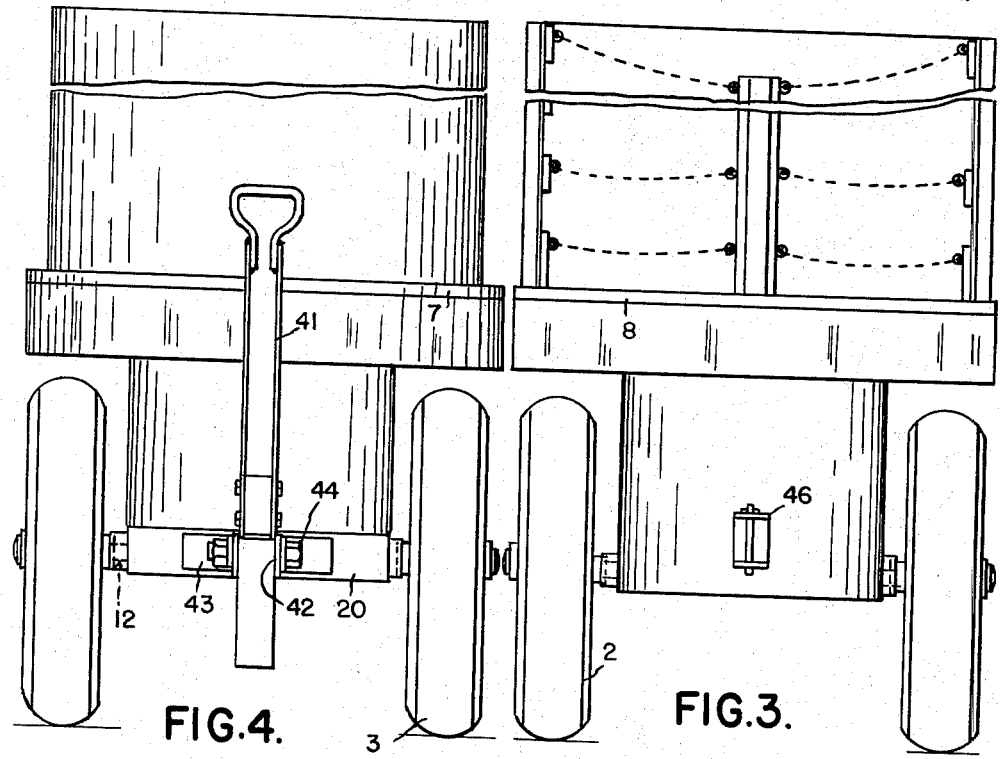
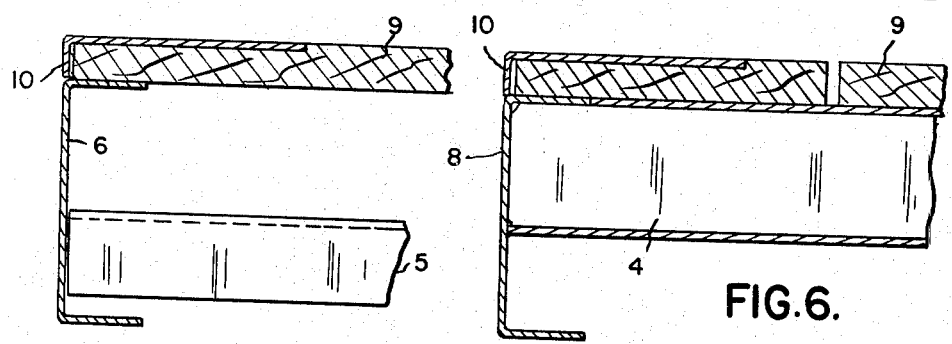
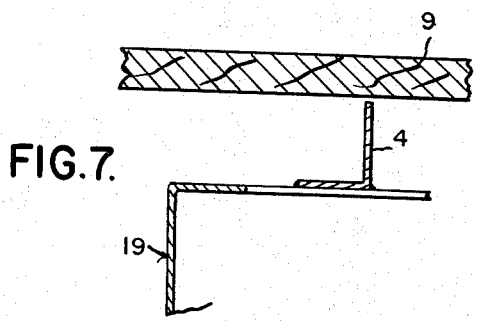
INVENTOR.
CLARENCE H. SAVERY
BY
Whittemore Hulbert & Belknap
ATTORNEYS

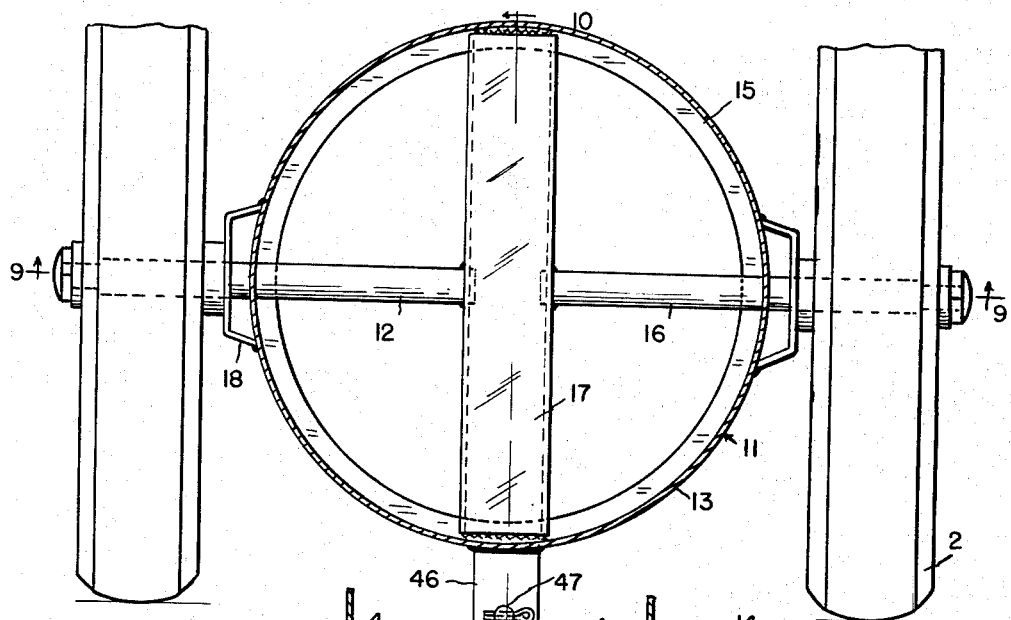
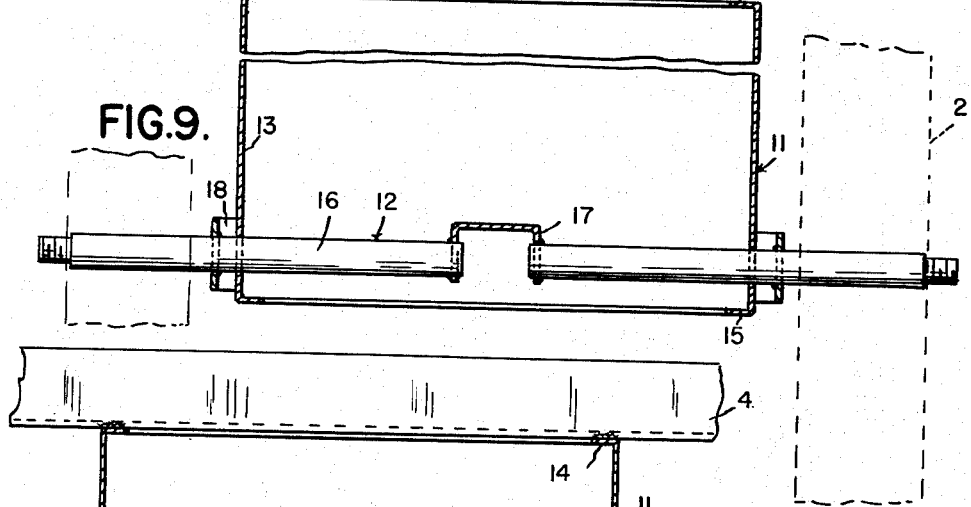
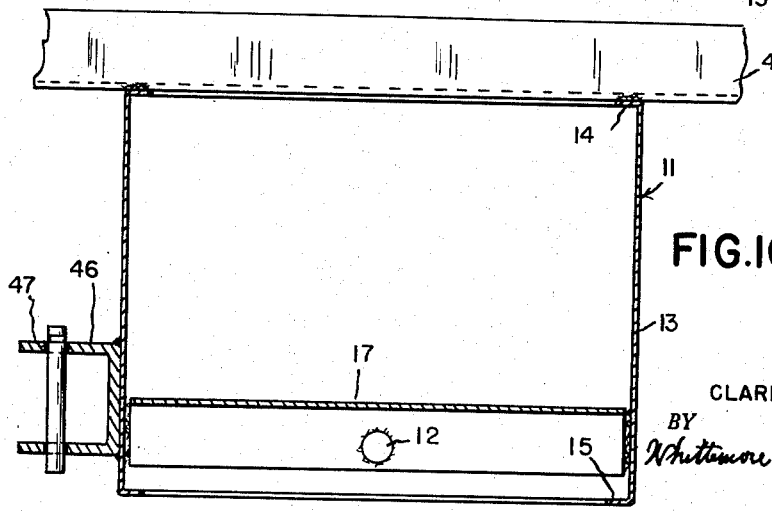

Sept. 21, 1954 C. H. SAVERY 2,689,748
AXLE SUPPORTING STRUCTURE FOR WHEELED VEHICLES
Filed Jan. 16, 1950 4 Sheets-Sheet 4

INVENTOR.
CLARENCE H. SAVERY
BY
*Whittemore Halbert & Belknap*
ATTORNEYS

Patented Sept. 21, 1954

2,689,748

UNITED STATES PATENT OFFICE 2,689,748

AXLE SUPPORTING STRUCTURE FOR WHEELED VEHICLES

Clarence H. Savery, Davenport, Iowa, assignor to Kelsey-Hayes Wheel Company, Detroit, Mich., a corporation of Delaware Application January 16, 1950, Serial No. 138,722

9 Claims. (Cl. 280—113)

The invention relates to wheeled vehicles and refers more particularly to vehicles having pairs of front and rear wheels.

The invention has for one of its objects to provide an improved construction of bolster between the rear wheels and the platform; to provide an improved construction of bolster and fifth wheel between the front wheels and the platform; and to provide improved constructions of front and rear axles.

With these and other objects in view the invention resides in the novel features of construction and combinations and arrangements of parts as more fully hereinafter set forth.

In the drawings:

Figure 1 is a side elevation partly broken away and in section showing a wheeled vehicle embodying the invention;

Figure 2 is a plan view thereof partly broken away and in section;

Figures 3 and 4 are respectively rear end and front end elevations;

Figure 11:
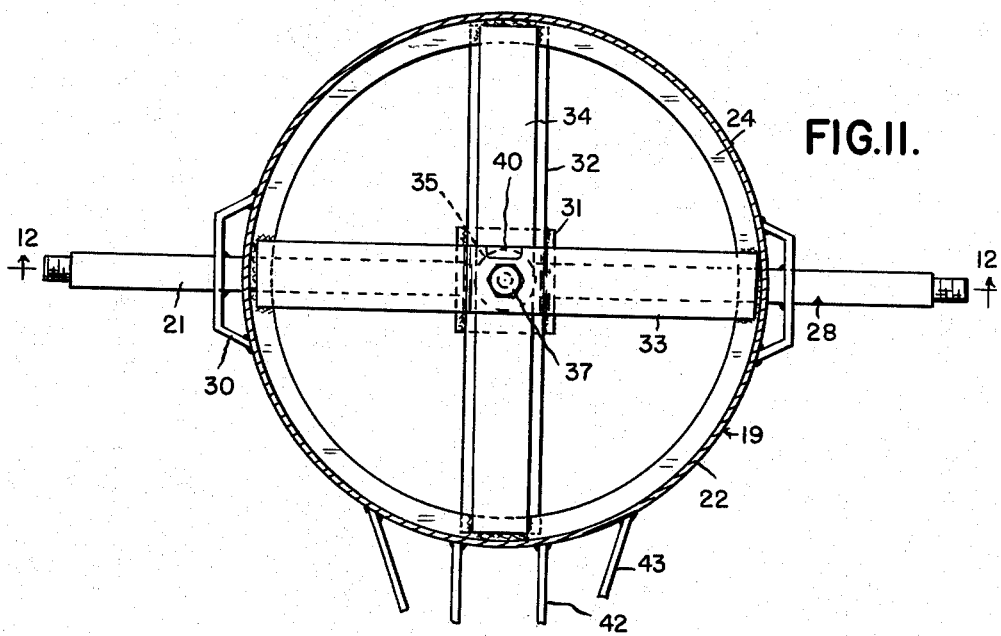

Figures 5, 6, 7 and 8 are cross sections respectively on the lines 5—5, 6—6, 7—7 and 8—8 of Figure 1;

Figures 9 and 10 are cross sections on the lines 9—9 and 10—10 respectively of Figure 8;

Figure 11 is a cross section on the line 11—11 of Figure 1; and

Figure 12:
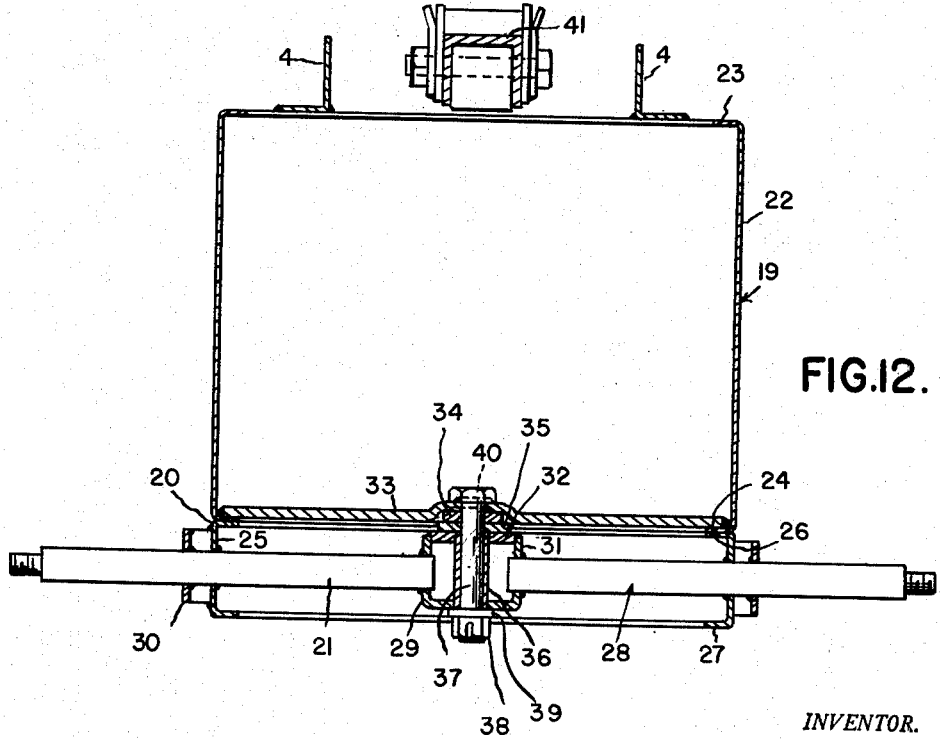

Figure 12 is a cross section on the line 12—12 of Figure 11.

The wheeled vehicle in general comprises the platform 1, the pair of rear wheels 2, the pair of front wheels 3, and bolsters for supporting the platform on the wheels. As illustrated in the present instance, the vehicle is a baggage truck in which the platform is provided with sockets for receiving upright stakes.

The platform has a frame comprising the pair of longitudinal beams 4, the pair of cross beams 5, the side rub rails 6 and the front and rear rub rails 7 and 8 respectively. The longitudinal beams are of channel cross section and open away from each other and the cross beams are of channel cross section and open downwardly and have their webs secured to the bottom flanges of the longitudinal beams preferably by being welded thereto. The rub rails are all of the same channel cross section with the side rub rails opening toward each other and the front and rear rub rails opening toward each other. The front rub rail is made semi-circular in plan so that the front end of the platform is semi-circular or arcuate to facilitate handling of the vehicle. The rub rails are mitered at their ends and the adjacent ends of the flanges and webs are secured to each other preferably by being welded together, the upper surfaces of the upper flanges being flush or in the same plane. The ends of the upper flanges of the longitudinal beams are cut away and the webs and lower flanges are secured to the front and rear rub rails preferably by being welded thereto, the upper surfaces of the upper flanges of the longitudinal beams and of the front and rear rub rails being flush or in the same plane. The cross beams are located above the lower flanges of the side rub rails and the ends of the cross beams are secured to the webs of the side rub rails preferably by being welded thereto. The platform also has the transverse boards 9 and the angle shaped guards 10 at the ends of the boards, both the boards and guards being suitably secured to the front and side rub rails as by bolts.

For supporting the platform on the rear wheels there is the bolster 11 below and extending transversely of and secured to the platform and the axle 12 on which the rear wheels are journaled. The bolster is a drum having the cylindrical wall 13 and the reinforcing inwardly extending top and bottom annular flanges 14 and 15 respectively, the top flange being secured to the lower flanges of the longitudinal beams 4 preferaby by being welded thereto. The axle 12 comprises the like spindles 16, the support 17 and the straps 18. The spindles are in axial alignment and extend through openings in the diametrically opposite sides of the drum wall. The support 17 is a downwardly opening channel shaped member which extends diametrically across the drum and longitudinally of the platform and its ends are secured to the drum wall, preferably by being welded thereto. The straps 18 are alike, each being of flared channel cross section with its base spaced outwardly from the drum wall and the ends of its legs secured to the drum wall preferably by being welded thereto. The flanges of the support 17 and the bases of the straps 18 are formed with holes in alignment with the holes in the drum wall for receiving the spindles 16, each spindle being secured at its inner end and intermediate its ends respectively to a support flange, a strap base and the drum wall, preferably by being welded thereto and having a portion beyond the strap base upon which the hub of the rear wheel 2 is journalled.

To support the platform on the front wheels and also provide for steering movement of the front wheels there is the bolster 19 below and extending transversely of and secured to the platform, the fifth wheel 20 below and rotatable relative to the bolster and the axle 21 on which the front wheels are journalled. The bolster is a drum having the cylindrical wall 22 and the reinforcing inwardly extending top and bottom flanges 23 and 24 respectively, the top flange being secured to the lower flanges of the longitudinal beams 4 preferably by being welded thereto. The fifth wheel is a drum having the cylindrical wall 25 and the reinforcing inwardly extending top and bottom annular flanges 26 and 27 respectively. The axle comprises the like spindles 28, the support 29 and the straps 30. The spindles are in axial alignment and extend through openings in diametrically opposite sides of the drum wall. The support 29 comprises the upwardly opening channel shaped saddle 31 and the bar 32 which is located between the upper edges of the side flanges of the saddle and is secured to these flanges preferably by being welded thereto. The bar extends diametrically across the drum and longitudinally of the platform and is secured at its ends to the lower face of the top flange 26 preferably by being welded thereto.

The straps 30 are of the same construction as the straps 18 and secured to the drum 20 in the same manner as the straps 18 are secured to the drum 11. The flanges of the saddle 29 and the bases of the straps 30 are formed with holes in alignment with the holes in the fifth wheel drum wall for receiving the spindles 28, each spindle being secured at its inner end and intermediate its ends respectively to a saddle flange and a strap base and also the fifth wheel drum wall preferably by being welded thereto. Each spindle has a portion beyond a strap base upon which the hub of the front wheel is journaled.

To pivotally connect the drums 19 and 20 in axial alignment with the flanges 24 and 26 of these drums in sliding contact, there are the transversely extending support bars 33 and 34, the washer 35, the bushing 36 and the king pin 37. The bars 33 and 34 extend at right angles and are secured to each other preferably by being welded together, the middle portion of the bar 33 being raised a distance equal to the thickness of the bar 34 so that the lower face of the latter is in the same plane as the lower faces of the end portions of the bar 33. The bars 33 and 34 extend diametrically across the drum 19 and their ends are secured to the lower flange 24 of the drum preferably by being welded thereto. The bushing 36 extends axially of the drums 19 and 20 and through the bar 32 and the base of the saddle 31. The king pin 37 is a bolt also in axial alignment with the drums 19 and 20 and extends through the bars 33 and 34, the washer 35 and the bushing 36, the bolt having a head at its upper end engaging the bar 33 and being threadedly engaged at its lower end by the nut 38. The flat washer 39 is preferably provided between the base of the saddle and the nut and abuts the lower end of the bushing 36, the upper end of this bushing abutting the washer 35. The bushing serves as a bearing for the saddle 31 and bar 32 during the rotation of the fifth wheel relative to the bolster. To hold the bolt 37 from rotation there is the upward depression 40 formed in the raised portion of the bar 33 and providing a flat face adjacent to and engageable with a face of the head of the bolt.

For pulling the truck, there is the tongue 41 having its rear end extending between the guide plates 42 which are secured at their rear ends to the cylindrical wall of the fifth wheel drum 20, preferably by being welded thereto. These plates are preferably reinforced by the angling plates 43, the rear ends of which are also secured to the fifth wheel drum wall, preferably by being welded thereto and the front ends of which are secured preferably in the same manner to the front ends of the plates 42. Both the plates 42 and 43 are formed with aligned openings in their front end portions for receiving the bolt 44 for pivotally connecting the tongue to the plates.

For bracing the rear drum 11, there is the downwardly opening channel shaped bar 45 extending between the upper end portion of the front drum 19 and the lower end portion of the rear drum 11 and secured to the same preferably by being welded thereto.

46 is a channel shaped hitch having its base secured to the rear side of the lower end portion of the rear drum 11 and its flanges extending horizontally rearwardly and formed with the aligned holes 47 for receiving a suitable hitch pin to connect a second vehicle to the vehicle above described.

What I claim as my invention is:

1. A wheeled vehicle comprising a platform, a drum below and extending transversely of and secured at its upper end to said platform, a channel shaped bar within the lower end of said drum extending diametrically thereacross and having its ends secured to the side wall of said drum, aligned spindles extending transversely of said bar, each extending through and secured to the side wall of said drum and having an end secured to a flange of said bar.

2. A wheeled vehicle comprising a platform, a drum below and extending transversely of and secured at its upper end to said platform, transversely extending bars secured to each other and located at the lower end of said drum, each bar extending across the drum and having its ends secured to said drum, a rotatable fifth wheel drum below and supporting said first mentioned drum, a U-shaped bar extending diametrically of said fifth wheel drum, a bar secured to the edges of the flanges of said U-shaped bar, axially aligned spindles extending transversely of said U-shaped bar, each spindle extending through and being secured to a side wall of said fifth wheel drum and having an end secured to a flange of said channel shaped bar and a king pin extending through said transversely extending bars and the base of said channel shaped bar in axial alignment with the axes of said drums.

3. In a vehicle, a load supporting drum having a side wall of annular cross section, a support extending across said drum and fixedly secured thereto, said support having a flanged member, and substantially axially aligned axle spindles each extending through a flange of said flanged member and the side wall of said drum and having a portion on which a ground engaging member of the vehicle is journalled.

4. In a wheeled vehicle, a substantially vertically extending load supporting drum having a cylindrical side wall, a support extending within and secured to said drum, said support having a channel shaped member, straps of channel cross section extending substantially parallel to said channel shaped member and secured to diametrically opposite sides of the side wall of said drum and substantially axially aligned axle spindles each extending through a flange of said channel shaped member, the side wall of said drum and the base of a strap and having a portion beyond said drum on which a wheel of the vehicle is journalled.

5. In a wheeled vehicle, a platform, an axle comprising substantially axially aligned axle spindles, a support having a channel shaped member, a strap member of channel cross section, a drum member for supporting said platform on said axle, said drum member having a side wall of annular cross section and also having substantially diametrically opposite holes in its side wall for the passage of said axle spindles, said support extending diametrically within said drum member and secured thereto and having its channel shaped member provided with holes in its side flanges in substantial alignment with the holes in said drum member side wall and said strap members being secured to diametrically opposite sides of the side wall of said drum member and having holes in substantial alignment with the holes in said drum member side wall, each of said axle spindles extending through a hole in one of the side flanges of said channel shaped member, a hole in the drum member side wall and a hole in one of said strap members and being fixedly secured to one of said members.

6. In a vehicle, a platform, an axle member, a drum member for supporting said platform on said axle member, said drum member having a side wall of annular cross section, a transverse member extending within and secured to said drum member and a channel shaped strap member secured to the side wall of said drum member, said transverse member, the side wall of said drum member and said strap member having substantially aligned holes for receiving said axle member and said axle member being fixedly secured to one of said members.

7. In a wheeled vehicle, a load supporting drum, a channel shaped member, a bar extending across and secured at its ends to said drum and also secured intermediate its ends to said channel shaped member and substantially axially aligned axle spindles each extending through the side wall of said drum and a flange of said channel shaped member and fixedly secured to the latter.

8. In a vehicle, a load supporting drum having a side wall of annular cross section, a support member extending across said drum and fixedly secured thereto, and substantially axially aligned axle spindles each extending through said support member and through the side wall of said drum and having a portion on which a ground engaging member of the vehicle is journalled.

9. In a vehicle, a platform, a drum extending transversely of and secured at its upper end to said platform, said drum having a side wall of annular cross section, a channel shaped member extending across and secured at its ends to said drum, and substantially axially aligned axle spindles each extending through the side wall of said drum and a flange of said channel shaped member and fixedly secured to the latter.

References Cited in the file of this patent

UNITED STATES PATENTS

| Number | Name | Date |
|---|---|---|
| 334,385 | Hotz | Jan. 12, 1886 |
| 369,268 | Thompson | Aug. 30, 1887 |
| 721,864 | Cox | Mar. 3, 1903 |
| 852,112 | Gilbreath | Apr. 30, 1907 |
| 877,159 | Babcock | Jan. 21, 1908 |
| 1,589,783 | Arndt | June 22, 1926 |
| 1,724,564 | Craig | Aug. 13, 1929 |
| 1,915,864 | Nabors | June 27, 1933 |
| 1,920,390 | Helms | Aug. 1, 1933 |
| 2,420,847 | Trabucco | May 20, 1947 |
| 2,508,610 | Kendall | May 23, 1950 |